(12) United States Patent
Carter

(10) Patent No.: US 11,763,322 B2
(45) Date of Patent: *Sep. 19, 2023

(54) CONTROLLING ENTERPRISE SOFTWARE POLICY COMPLIANCE ASSESSMENT PROCESSES BASED ON QUANTUM COMBINATIONS OF ASSESSMENT ELEMENTS

(71) Applicant: Bank of America Corporation, Charlotte, NC (US)

(72) Inventor: Lonnie Jason Carter, Kingwood, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,128

(22) Filed: Oct. 12, 2021

(65) Prior Publication Data
US 2022/0101339 A1    Mar. 31, 2022

Related U.S. Application Data

(63) Continuation of application No. 16/377,845, filed on Apr. 8, 2019, now Pat. No. 11,182,800.

(51) Int. Cl.
*G06Q 30/01* (2023.01)
*G06Q 30/018* (2023.01)
(Continued)

(52) U.S. Cl.
CPC ....... *G06Q 30/018* (2013.01); *G06F 11/3072* (2013.01); *G06N 10/00* (2019.01);
(Continued)

(58) Field of Classification Search
CPC .................................................. G06Q 30/01
See application file for complete search history.

(56) References Cited

U.S. PATENT DOCUMENTS 8,185,903 B2    5/2012    Fulton et al.
8,332,862 B2    12/2012    Isard et al.
(Continued)

FOREIGN PATENT DOCUMENTS

WO    WO-2014078492 A1 *    5/2014    ..... G06Q 10/063112

OTHER PUBLICATIONS

Linda Allal and Lucie Mottier Lopez, Formative Assessment of Learning: A Review of Publications, Formative Assessment—Improving Learning in Secondary Classrooms, OECD 2005. (Year: 2005).*

*Primary Examiner* — Kurtis Gills
(74) *Attorney, Agent, or Firm* — Banner & Witcoff, Ltd.

(57) ABSTRACT

Aspects of the disclosure relate to controlling enterprise software policy compliance assessment processes based on quantum combinations of assessment elements. A computing platform may receive an assessment dataset and may generate a time-independent requisite work dataset. The time-independent requisite work dataset may include assessment information identifying a plurality of real branded assessment quanta and priority information identifying a plurality of priority scores. Each priority score of the plurality of priority scores may correspond to an assessment quantum of the plurality of real branded assessment quanta. The computing platform may optimize the time-independent requisite work dataset by aggregating related assessment quanta associated with the plurality of real branded assessment quanta, and this may produce a prioritized schedule of application assessment quanta. Subsequently, the computing platform may generate and send a plurality of non-overlapping assessment prompts based on the prioritized schedule of application assessment quanta.

20 Claims, 13 Drawing Sheets

(51) Int. Cl.
*G06N 10/00* (2022.01)
*G06F 11/30* (2006.01)
*G06Q 10/0635* (2023.01)
*G06Q 10/0631* (2023.01)
*G06Q 10/0633* (2023.01)

(52) U.S. Cl.
CPC ... *G06Q 10/0635* (2013.01); *G06Q 10/06316* (2013.01); *G06Q 10/0633* (2013.01)

(56) References Cited

U.S. PATENT DOCUMENTS

| | | | |
|---|---|---|---|
| 8,527,444 B2 | 9/2013 | Van Hentenryck et al. | |
| 8,606,386 B2 | 12/2013 | Pereira | |
| 8,897,449 B1 | 11/2014 | Broadbent | |
| 9,183,058 B2 | 11/2015 | Li et al. | |
| 9,313,022 B2 | 4/2016 | Jacquin et al. | |
| 10,044,638 B2 | 8/2018 | Dadashikelayeh et al. | |
| 10,152,358 B2 | 12/2018 | Dadashikelayeh et al. | |
| 2005/0256735 A1* | 11/2005 | Bayne | G06Q 10/06 705/7.11 |
| 2009/0204470 A1* | 8/2009 | Weyl | G06Q 10/06 705/7.13 |
| 2014/0136255 A1* | 5/2014 | Grabovski | G06Q 10/063114 705/7.14 |
| 2017/0223143 A1 | 8/2017 | Johnson et al. | |
| 2017/0330101 A1 | 11/2017 | Hastings et al. | |
| 2018/0246758 A1* | 8/2018 | Cardonha | G06F 9/4881 |
| 2018/0308000 A1 | 10/2018 | Dukatz et al. | |
| 2018/0359811 A1 | 12/2018 | Verzun et al. | |
| 2018/0367309 A1 | 12/2018 | Reinhold | |
| 2018/0367409 A1 | 12/2018 | Zhang et al. | |
| 2018/0368007 A1 | 12/2018 | Cummings | |
| 2018/0368019 A1 | 12/2018 | Nammi et al. | |
| 2018/0375892 A1* | 12/2018 | Ganor | H04L 63/20 |
| 2018/0375940 A1 | 12/2018 | Binder et al. | |
| 2018/0376483 A1 | 12/2018 | Lee | |
| 2019/0005004 A1 | 1/2019 | Lane et al. | |
| 2019/0005023 A1 | 1/2019 | Olsen et al. | |
| 2019/0005071 A1 | 1/2019 | Kvalnes et al. | |
| 2019/0005072 A1 | 1/2019 | Kvalnes et al. | |
| 2019/0005317 A1 | 1/2019 | Uhlemann | |
| 2019/0007078 A1 | 1/2019 | Tsui et al. | |
| 2019/0007296 A1 | 1/2019 | Sheleheda et al. | |
| 2019/0007459 A1 | 1/2019 | Tipton et al. | |
| 2019/0014457 A1 | 1/2019 | Kodaypak et al. | |
| 2019/0014458 A1 | 1/2019 | Kodaypak | |
| 2019/0014524 A1 | 1/2019 | Hu et al. | |
| 2019/0018975 A1 | 1/2019 | Goldfarb et al. | |
| 2019/0028359 A1 | 1/2019 | Pignataro et al. | |
| 2019/0034453 A1 | 1/2019 | Jarvis et al. | |
| 2019/0034820 A1 | 1/2019 | Manning et al. | |
| 2019/0034905 A1 | 1/2019 | Schlesinger et al. | |
| 2019/0036975 A1 | 1/2019 | Beckman et al. | |
| 2019/0037444 A1 | 1/2019 | Austin et al. | |
| 2019/0042407 A1 | 2/2019 | Gao et al. | |
| 2019/0044938 A1 | 2/2019 | DeWeese et al. | |
| 2019/0044947 A1 | 2/2019 | Stuntebeck et al. | |
| 2019/0044949 A1 | 2/2019 | Bartfai-Walcott et al. | |
| 2019/0045403 A1 | 2/2019 | Cui et al. | |
| 2019/0053104 A1 | 2/2019 | Qiao et al. | |
| 2019/0053147 A1 | 2/2019 | Qiao et al. | |
| 2019/0053201 A1 | 2/2019 | Nammi et al. | |
| 2019/0058629 A1 | 2/2019 | Akoum et al. | |
| 2019/0065032 A1 | 2/2019 | Lin | |
| 2019/0065093 A1 | 2/2019 | Karr et al. | |
| 2019/0065788 A1 | 2/2019 | Vijayasankar et al. | |
| 2019/0068675 A1 | 2/2019 | Dowlatkhah et al. | |
| 2019/0073152 A1 | 3/2019 | Nagle et al. | |
| 2019/0073722 A1 | 3/2019 | Obradovic | |
| 2019/0075121 A1 | 3/2019 | Dutta | |
| 2019/0075156 A1 | 3/2019 | Kalgi | |
| 2019/0080000 A1 | 3/2019 | Munoz et al. | |
| 2019/0082320 A1 | 3/2019 | Avasarala et al. | |
| 2019/0088105 A1 | 3/2019 | Lawson | |
| 2019/0089647 A1 | 3/2019 | Das et al. | |
| 2019/0089746 A1 | 3/2019 | Beckman et al. | |
| 2019/0095174 A1 | 3/2019 | Trudel et al. | |
| 2019/0098039 A1 | 3/2019 | Gates et al. | |
| 2019/0098090 A1 | 3/2019 | Binder et al. | |

\* cited by examiner

CONTROLLING ENTERPRISE SOFTWARE POLICY COMPLIANCE ASSESSMENT PROCESSES BASED ON QUANTUM COMBINATIONS OF ASSESSMENT ELEMENTS

CROSS REFERENCE TO RELATED APPLICATIONS

This application is a continuation of and claims priority to U.S. application Ser. No. 16/377,845, filed Apr. 8, 2019, and entitled, "Controlling Enterprise Software Policy Compliance Assessment Processes Based on Quantum Combinations of Assessment Elements," which is incorporated herein by reference in its entirety.

BACKGROUND

Aspects of the disclosure relate to digital data processing systems, quantum mechanical systems where data is processed according to artificial intelligence methods, and enterprise software policy compliance assessment processes. In particular, one or more aspects of the disclosure relate to controlling enterprise software policy compliance assessment processes based on quantum combinations of assessment elements.

Enterprise organizations may utilize various software applications, which may execute in various computing environments and be subject to different sets of policies in different computing environments. For instance, such policies may impose rules governing how confidential information and/or other sensitive data is created, modified, and/or otherwise used by specific applications in specific environments. In many instances, however, it may be difficult to ensure that specific software applications in different computing environments are in compliance with various policies, while also attempting to optimize the resource utilization, bandwidth utilization, and efficient operations of the computing infrastructure that hosts and/or otherwise supports the various software applications and computing environments.

SUMMARY

Aspects of the disclosure provide effective, efficient, scalable, and convenient technical solutions that address and overcome the technical problems associated with hosting and executing enterprise software applications in various computing environments by controlling enterprise software policy compliance assessment processes based on quantum combinations of assessment elements.

In accordance with one or more embodiments, a computing platform having at least one processor, a communication interface, and memory may receive, via the communication interface, from a compliance administrator user computing device, an assessment dataset. Subsequently, the computing platform may generate a time-independent requisite work dataset based on the assessment dataset received from the compliance administrator user computing device. The time-independent requisite work dataset may include assessment information identifying a plurality of real branded assessment quanta and priority information identifying a plurality of priority scores, and each priority score of the plurality of priority scores may correspond to an assessment quantum of the plurality of real branded assessment quanta. Then, the computing platform may optimize the time-independent requisite work dataset by aggregating related assessment quanta associated with the plurality of real branded assessment quanta, and optimizing the time-independent requisite work dataset may produce a prioritized schedule of application assessment quanta. Subsequently, the computing platform may generate a plurality of non-overlapping assessment prompts based on the prioritized schedule of application assessment quanta. Then, the computing platform may send, via the communication interface, to a plurality of application assessor user computing devices, the plurality of non-overlapping assessment prompts generated based on the prioritized schedule of application assessment quanta.

In some embodiments, receiving the assessment dataset from the compliance administrator user computing device may include receiving information identifying a plurality of applications, information identifying a plurality of environments, information identifying a plurality of policies, information identifying priority data associated with the plurality of policies, information identifying a plurality of branded assessments, and information identifying priority values associated with the plurality of branded assessments.

In some embodiments, generating the time-independent requisite work dataset based on the assessment dataset received from the compliance administrator user computing device may include executing a first inclusion process in which a plurality of application-environment-policy quanta are produced by applying each policy of a plurality of policies identified in the assessment dataset to each application-environment combination of a plurality of application-environment combinations identified in the assessment dataset. In addition, executing the first inclusion process may produce a first inclusive dataset.

In some embodiments, generating the time-independent requisite work dataset based on the assessment dataset received from the compliance administrator user computing device may include, after executing the first inclusion process, executing a first exclusion process in which one or more application-environment-policy quanta are removed from the first inclusive dataset based on policy exception data. In addition, executing the first exclusion process may produce a first filtered dataset.

In some embodiments, executing the first exclusion process may include receiving the policy exception data from the compliance administrator user computing device.

In some embodiments, the policy exception data may identify a first set of policies not levied against one or more specific applications and a second set of policies not levied against one or more specific environments.

In some embodiments, generating the time-independent requisite work dataset based on the assessment dataset received from the compliance administrator user computing device may include, after executing the first exclusion process, executing a second inclusion process in which a plurality of branded-assessment quanta are produced by applying a plurality of branded assessments and corresponding priority scores to each application-environment-policy quanta included in the first filtered dataset. In addition, executing the second inclusion process may produce a second inclusive dataset.

In some embodiments, generating the time-independent requisite work dataset based on the assessment dataset received from the compliance administrator user computing device may include, after executing the second inclusion process, executing a second exclusion process in which one or more branded-assessment quanta are removed from the second inclusive dataset based on application-policy-environment scope data. In addition, executing the second exclusion process may produce the time-independent requisite work dataset that includes the assessment information identifying the plurality of real branded assessment quanta and the priority information identifying the plurality of priority scores.

In some embodiments, executing the second exclusion process may include receiving the application-policy-environment scope data from the compliance administrator user computing device.

In some embodiments, the application-policy-environment scope data may identify a set of applications that are out of scope for one or more specific branded assessments, a set of policies that are out of scope for one or more specific branded assessments, and a set of environments that are out of scope for one or more specific branded assessments.

In some embodiments, optimizing the time-independent requisite work dataset by aggregating the related assessment quanta associated with the plurality of real branded assessment quanta may include removing branded-assessment identifiers from the plurality of real branded assessment quanta. In addition, removing the branded-assessment identifiers from the plurality of real branded assessment quanta may produce a generalized dataset of generalized assessment quanta. Then, identical generalized assessment quanta included in the generalized dataset of generalized assessment quanta may be combined to produce an aggregated dataset of aggregated assessment quanta. In addition, combining the identical generalized assessment quanta may include aggregating priority scores associated with the identical generalized assessment quanta.

In some embodiments, optimizing the time-independent requisite work dataset by aggregating the related assessment quanta associated with the plurality of real branded assessment quanta may include ordering the aggregated dataset of aggregated assessment quanta based on an aggregate priority score associated with each aggregated assessment quantum included in the aggregated dataset of aggregated assessment quanta. In addition, ordering the aggregated dataset of aggregated assessment quanta may produce the prioritized schedule of application assessment quanta.

In some embodiments, sending the plurality of non-overlapping assessment prompts generated based on the prioritized schedule of application assessment quanta to the plurality of application assessor user computing devices may include: sending, via the communication interface, to a first assessor user computing device, a first assessment prompt associated with a first application assessment quantum selected from the prioritized schedule of application assessment quanta; and sending, via the communication interface, to a second assessor user computing device different from the first assessor user computing device, a second assessment prompt associated with a second application assessment quantum selected from the prioritized schedule of application assessment quanta, where the second application assessment quantum is different from the first application assessment quantum.

In some embodiments, the computing platform may generate one or more user interface elements based on the prioritized schedule of application assessment quanta. In addition, the one or more user interface elements generated based on the prioritized schedule of application assessment quanta may be provided to the compliance administrator user computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to controlling enterprise software policy compliance assessment processes based on quantum combinations of assessment elements. For instance, an example method involves dissolving discrete, branded assessments; deconstructing policies into fragments; and defining all possible quantum combinations of the pertinent elements. This example method may allow for the risk-based prioritization of work effort to maximize efficiency, while meeting all regulatory requirements outlined in the original branded assessments. Quantum mechanical principles may be applied to a generalized policy compliance assessment process, so as to provide a generalized scheduling method that optimizes risk prioritization and maximizes process efficiency.

Figure 1A:
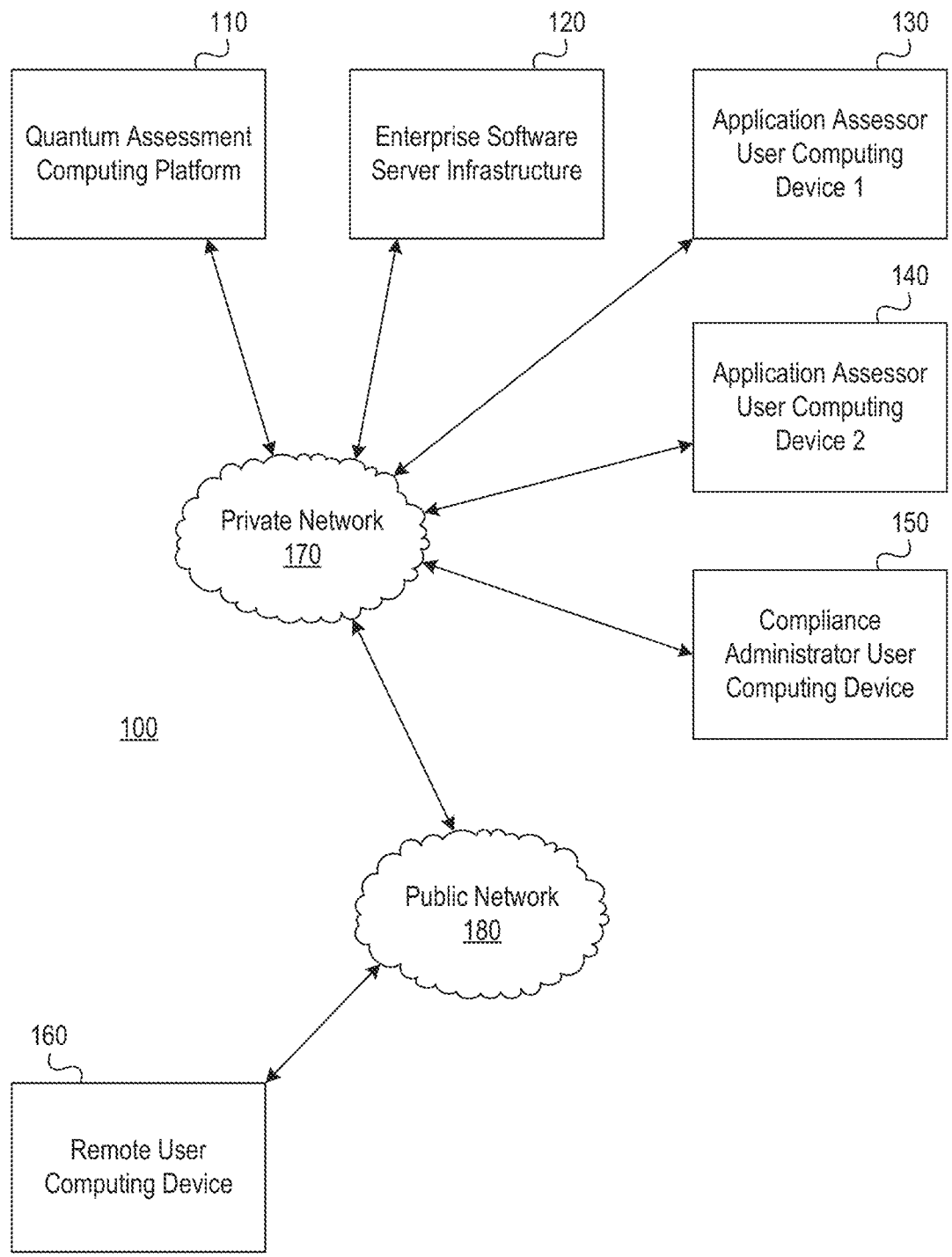
FIGS. 1A and 1B depict an illustrative computing environment for controlling enterprise software policy compliance assessment processes based on quantum combinations of assessment elements in accordance with one or more example embodiments.
Figure 1B:
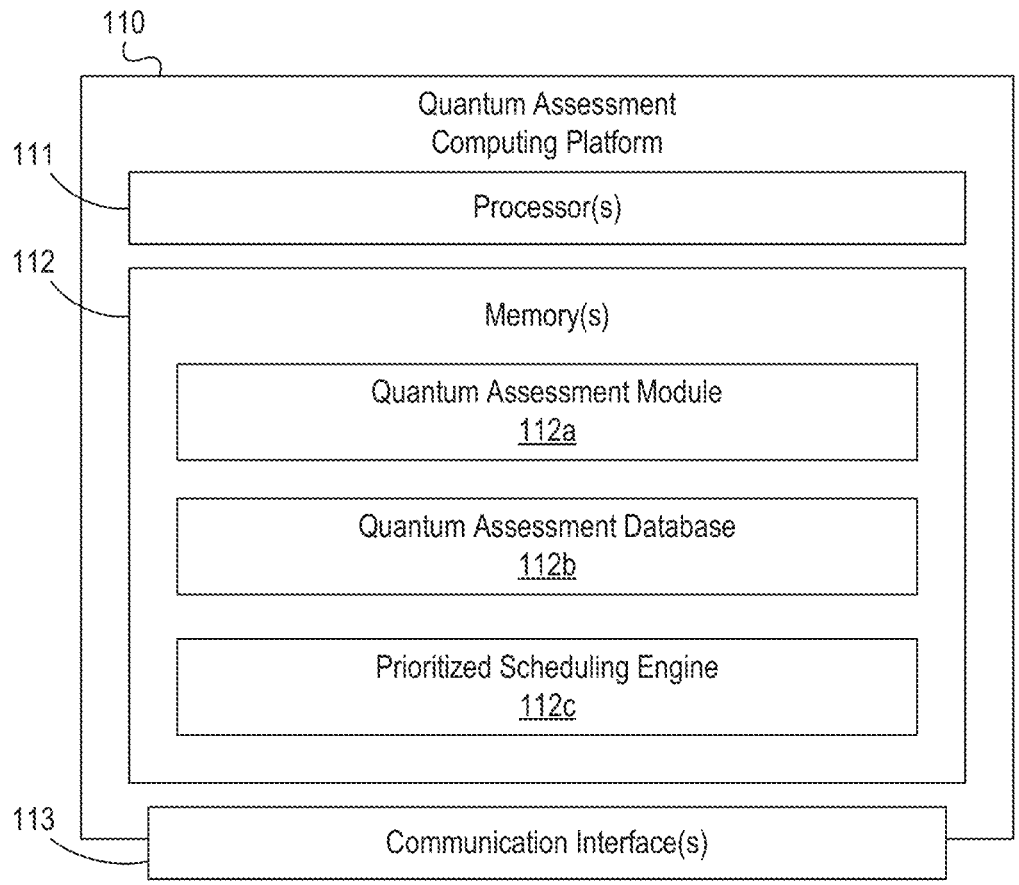

FIGS. 1A and 1B depict an illustrative computing environment for controlling enterprise software policy compliance assessment processes based on quantum combinations of assessment elements in accordance with one or more example embodiments. Referring to FIG. 1A, computing environment 100 may include one or more computer systems. For example, computing environment 100 may include a quantum assessment computing platform 110, enterprise software server infrastructure 120, a first application assessor user computing device 130, a second application assessor user computing device 140, a compliance administrator user computing device 150, and a remote user computing device 160.

As illustrated in greater detail below, quantum assessment computing platform 110 may include one or more computing devices configured to perform one or more of the functions described herein. For example, quantum assessment computing platform 110 may include one or more computers (e.g., laptop computers, desktop computers, servers, server blades, or the like).

Enterprise software server infrastructure 120 may include one or more computing devices and/or other computer components (e.g., processors, memories, communication interfaces). In addition, enterprise software server infrastructure 120 may be configured to host, execute, and/or otherwise provide one or more enterprise applications. For example, enterprise software server infrastructure 120 may be configured to host, execute, and/or otherwise provide one or more transaction processing programs, loan application processing programs, and/or other programs associated with an enterprise organization, such as a financial institution. In some instances, enterprise software server infrastructure 120 may be configured to provide various enterprise and/or back-office computing functions for an enterprise organization, such as a financial institution. For example, enterprise software server infrastructure 120 may include various servers and/or databases that store and/or otherwise maintain account information, such as financial account information including account balances, transaction history, account owner information, and/or other information. In addition, enterprise software server infrastructure 120 may process and/or otherwise execute transactions on specific accounts based on commands and/or other information received from other computer systems included in computing environment 100. Additionally or alternatively, enterprise software server infrastructure 120 may receive interrogation requests from quantum assessment computing platform 110 and return operating state data to quantum assessment computing platform 110 in response to such interrogation requests, which may enable quantum assessment computing platform 110 to identify applications, environments, and/or policies associated with enterprise software server infrastructure 120 that may be subject to one or more compliance assessments.

Application assessor user computing device 130 may be a personal computing device (e.g., desktop computer, laptop computer) or mobile computing device (e.g., smartphone, tablet). In addition, application assessor user computing device 130 may be linked to and/or used by a specific enterprise user (who may, e.g., be an employee or other affiliate of an enterprise organization operating quantum assessment computing platform 110). For instance, application assessor user computing device 130 may be linked to and/or used by a first enterprise user who develops and/or maintains responsibility for one or more specific enterprise software applications and/or one or more specific software application operating environments. Application assessor user computing device 140 also may be a personal computing device (e.g., desktop computer, laptop computer) or mobile computing device (e.g., smartphone, tablet). In addition, application assessor user computing device 140 may be linked to and/or used by a specific enterprise user (who may, e.g., be an employee or other affiliate of an enterprise organization operating quantum assessment computing platform 110, and who may be different from the user of application assessor user computing device 130). For instance, application assessor user computing device 140 may be linked to and/or used by a second enterprise user who develops and/or maintains responsibility for one or more specific enterprise software applications and/or one or more specific software application operating environments.

Compliance administrator user computing device 150 may be a personal computing device (e.g., desktop computer, laptop computer) or mobile computing device (e.g., smartphone, tablet). In addition, compliance administrator user computing device 150 may be linked to and/or used by an administrative user (who may, e.g., be an information technology systems administrator of an enterprise organization operating quantum assessment computing platform 110). For instance, compliance administrator user computing device 150 may be linked to and/or used by an administrative user who is responsible for investigating and confirming that various software applications in various operating environments comply with various policies and/or policy assessments.

Remote user computing device 160 may be a personal computing device (e.g., desktop computer, laptop computer) or mobile computing device (e.g., smartphone, tablet). In addition, remote user computing device 160 may be linked to and/or used by an external user (who may, e.g., be a remote user of an enterprise organization operating quantum assessment computing platform 110 and who may interact with one or more enterprise resources while using a device located outside of an enterprise firewall associated with quantum assessment computing platform 110).

Computing environment 100 also may include one or more networks, which may interconnect one or more of quantum assessment computing platform 110, enterprise software server infrastructure 120, application assessor user computing device 130, application assessor user computing device 140, compliance administrator user computing device 150, and remote user computing device 160. For example, computing environment 100 may include a private network 170 (which may, e.g., interconnect quantum assessment computing platform 110, enterprise software server infrastructure 120, application assessor user computing device 130, application assessor user computing device 140, compliance administrator user computing device 150, and/or one or more other systems which may be associated with an organization, such as a financial institution) and public network 180 (which may, e.g., interconnect remote user computing device 160 with private network 170 and/or one or more other systems, public networks, sub-networks, and/or the like).

In one or more arrangements, enterprise software server infrastructure 120, application assessor user computing device 130, application assessor user computing device 140, compliance administrator user computing device 150, remote user computing device 160, and/or the other systems included in computing environment 100 may be any type of computing device capable of receiving a user interface, receiving input via the user interface, and communicating the received input to one or more other computing devices. For example, enterprise software server infrastructure 120, application assessor user computing device 130, application assessor user computing device 140, compliance administrator user computing device 150, remote user computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of quantum assessment computing platform 110, enterprise software server infrastructure 120, application assessor user computing device 130, application assessor user computing device 140, compliance administrator user computing device 150, and remote user computing device 160 may, in some instances, be special-purpose computing devices configured to perform specific functions.

Referring to FIG. 1B, quantum assessment computing platform 110 may include one or more processors 111, memory 112, and communication interface 113. A data bus may interconnect processor 111, memory 112, and communication interface 113. Communication interface 113 may be a network interface configured to support communication between quantum assessment computing platform 110 and one or more networks (e.g., network 170, network 180, or the like). Memory 112 may include one or more program modules having instructions that when executed by processor 111 cause quantum assessment computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of quantum assessment computing platform 110 and/or by different computing devices that may form and/or otherwise make up quantum assessment computing platform 110. For example, memory 112 may have, store, and/or include a quantum assessment module 112a, a quantum assessment database 112b, and a prioritized scheduling engine 112c. Quantum assessment module 112a may have instructions that direct and/or cause quantum assessment computing platform 110 to control enterprise software policy compliance assessment processes based on quantum combinations of assessment elements, as discussed in greater detail below. Quantum assessment database 112b may store information used by quantum assessment module 112a and/or quantum assessment computing platform 110 in controlling enterprise software policy compliance assessment processes based on quantum combinations of assessment elements. Prioritized scheduling engine 112c may aggregate assessment quanta, optimize time-independent requisite work datasets, and/or perform one or more other functions associated with controlling enterprise software policy compliance assessment processes based on quantum combinations of assessment elements.

Figure 2:
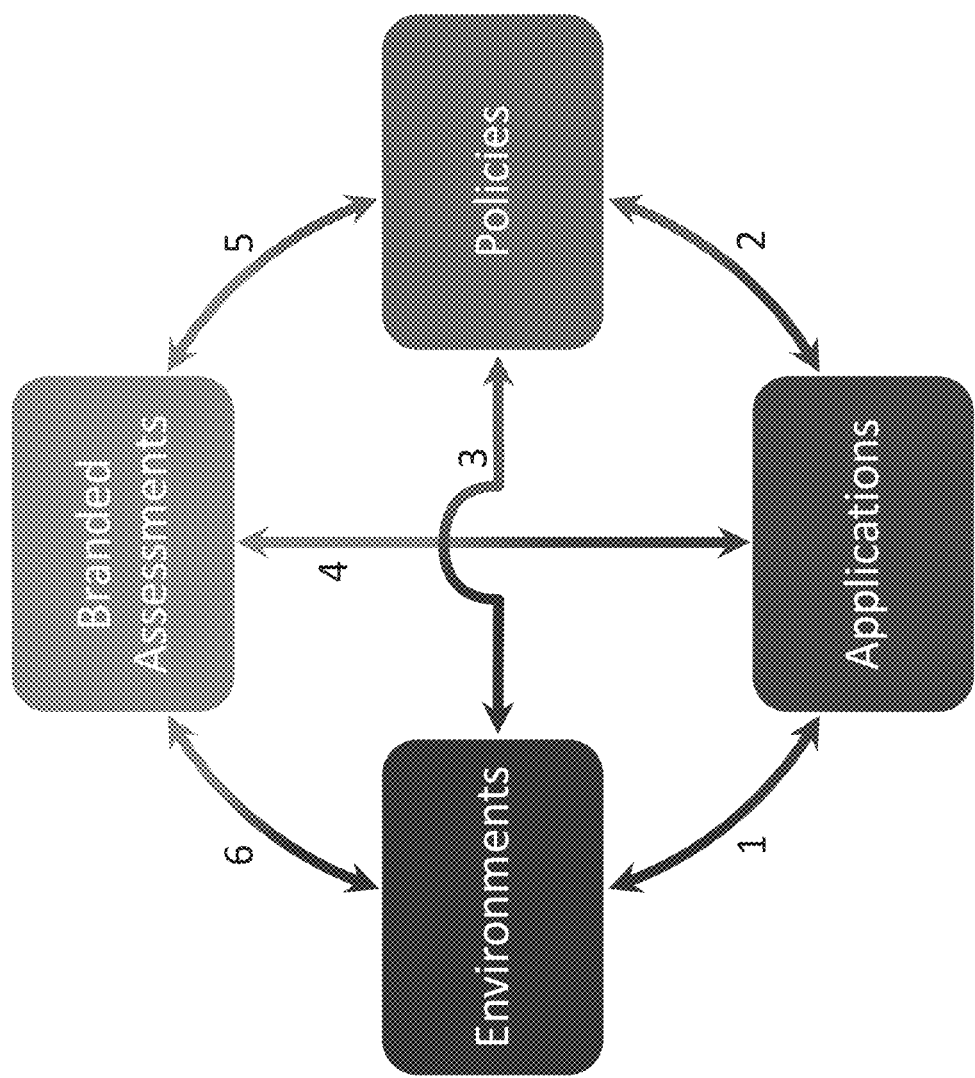
FIGS. 2-7 depict illustrative examples and algorithms for controlling enterprise software policy compliance assessment processes based on quantum combinations of assessment elements in accordance with one or more example embodiments.
Figure 3:
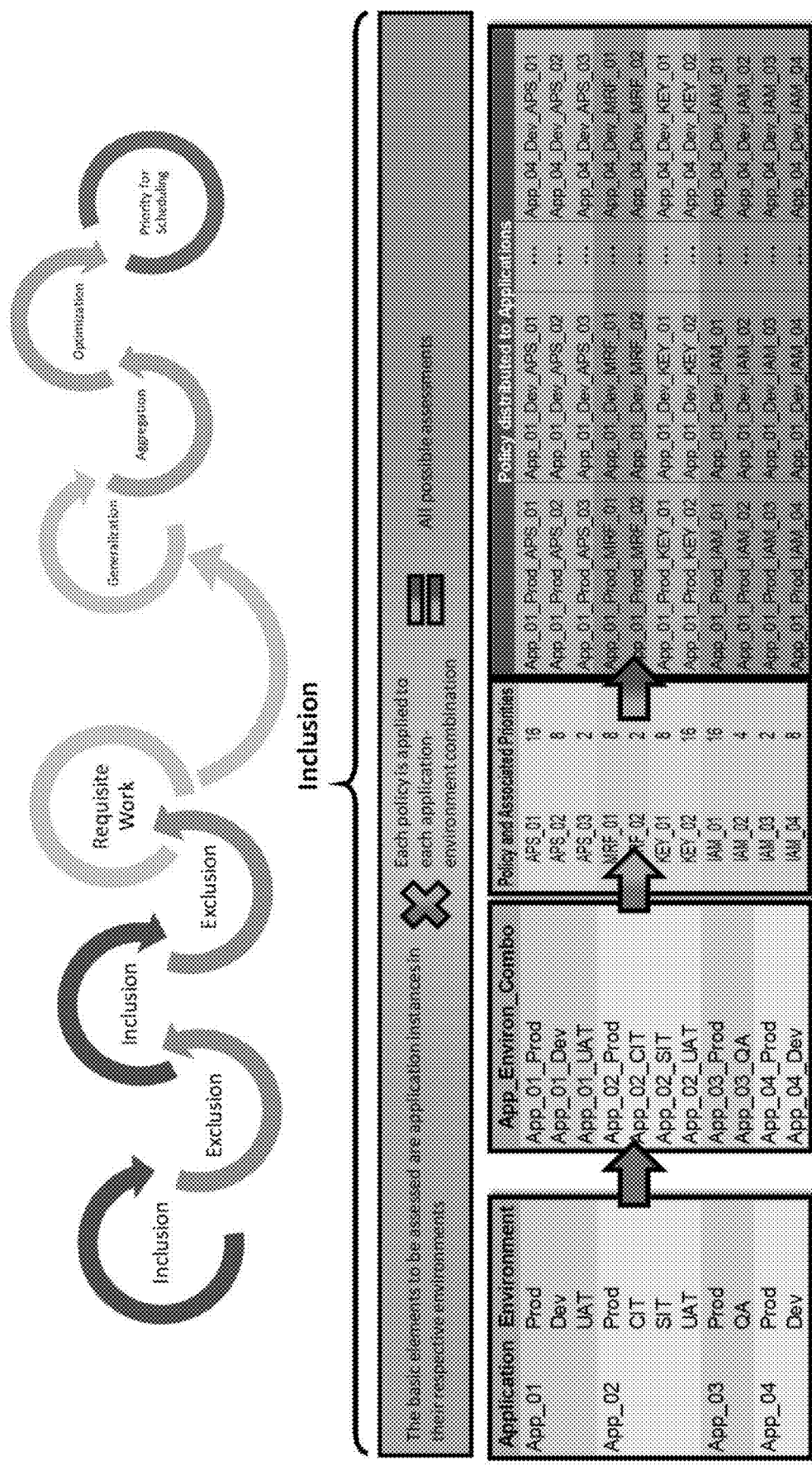
Figure 4:
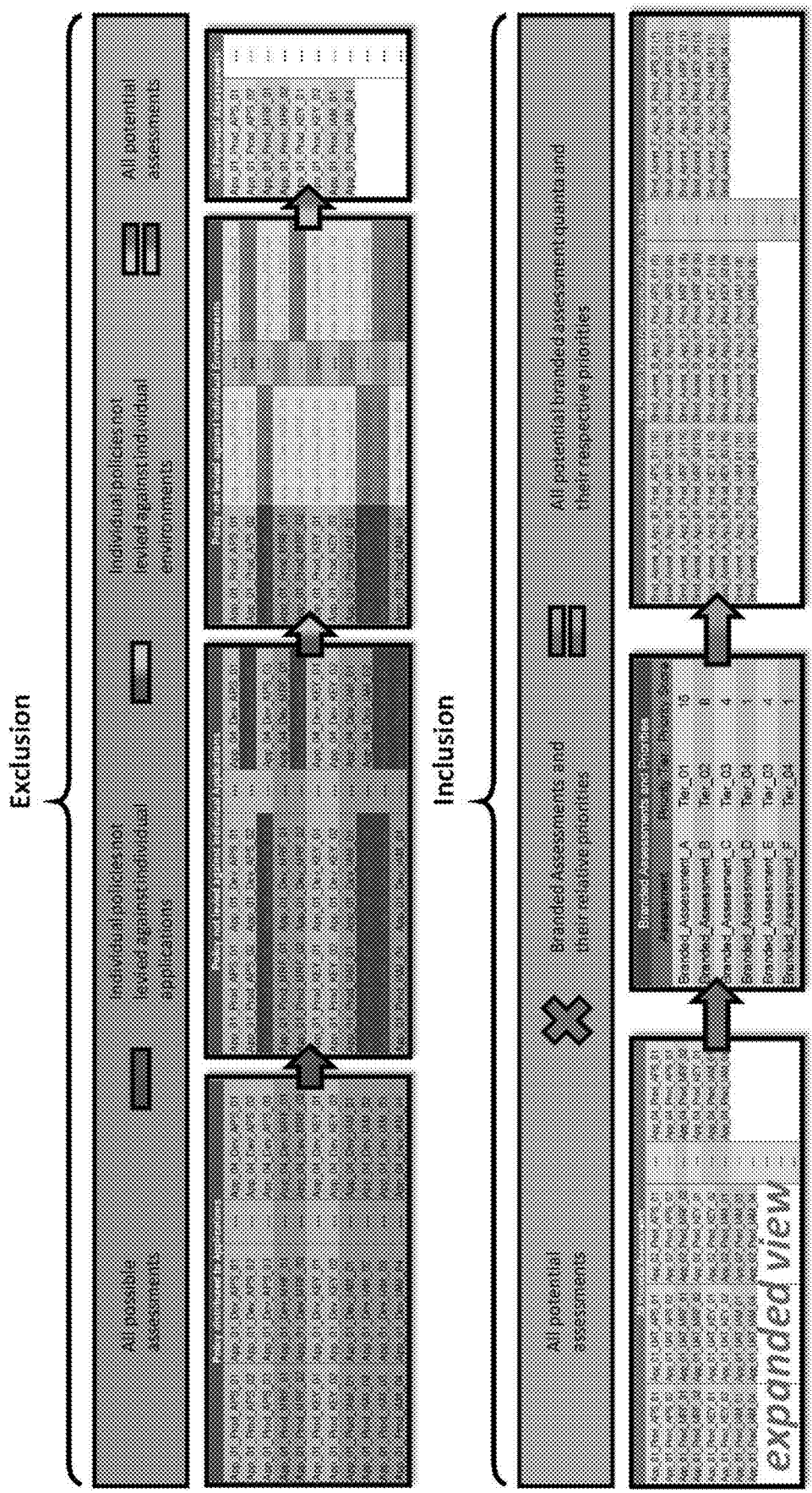
Figure 5:
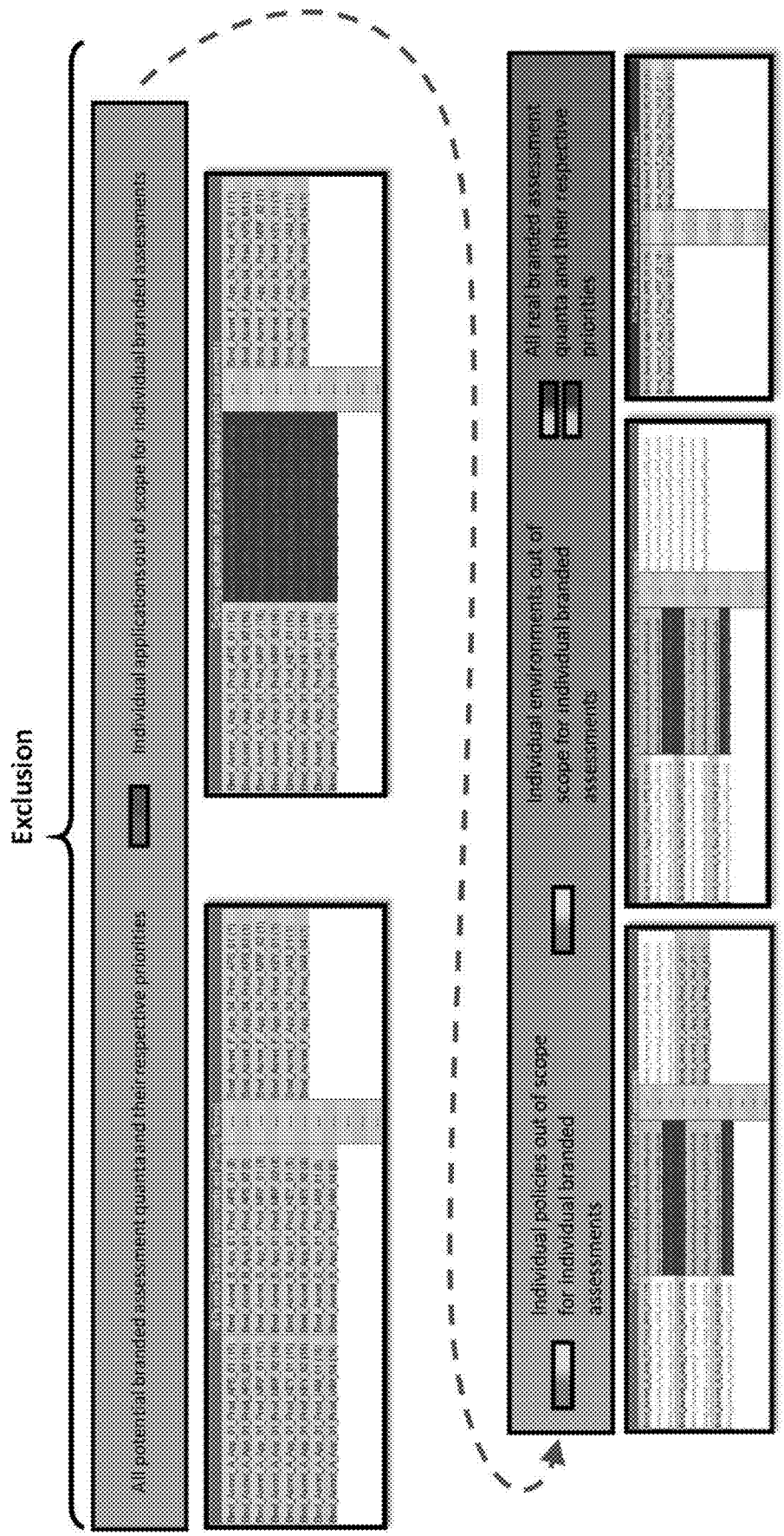

FIGS. 2-7 depict illustrative examples and algorithms for controlling enterprise software policy compliance assessment processes based on quantum combinations of assessment elements in accordance with one or more example embodiments. For example, FIG. 2 illustrates homomorphic relationships that may be considered in integrating multiple generalized branded assessments and optimizing scheduling for such branded assessments. For instance, each branded assessment may be associated with a set of policies that are assed for compliance. Assessed applications may have instances in multiple environments, and different priorities may arise from different risk profiles. Across multiple assessments, it is possible that there are redundant elements and combinations of elements (e.g., application set, policy, environment, priority). These possible redundant combinations may arise from historical, branded assessment schemas, some of which, for regulatory and compliance reporting, might need to persist at least nominally alongside a common assessment schema. To address these issues, some aspects of the disclosure provide techniques that enable the assimilation of any assessment of the type (e.g., per-environment application subject to policy), as well as the flexibility to intake variations of the type. In addition, to address redundancies in a universal body associated with both branded assessments and a universal assessment, a quantum computing approach may be employed. As illustrated below, this quantum computing approach may utilize a combinatorial solution (e.g., inclusion-exclusion principle) in conjunction with an optimization algorithm.

Figure 6:
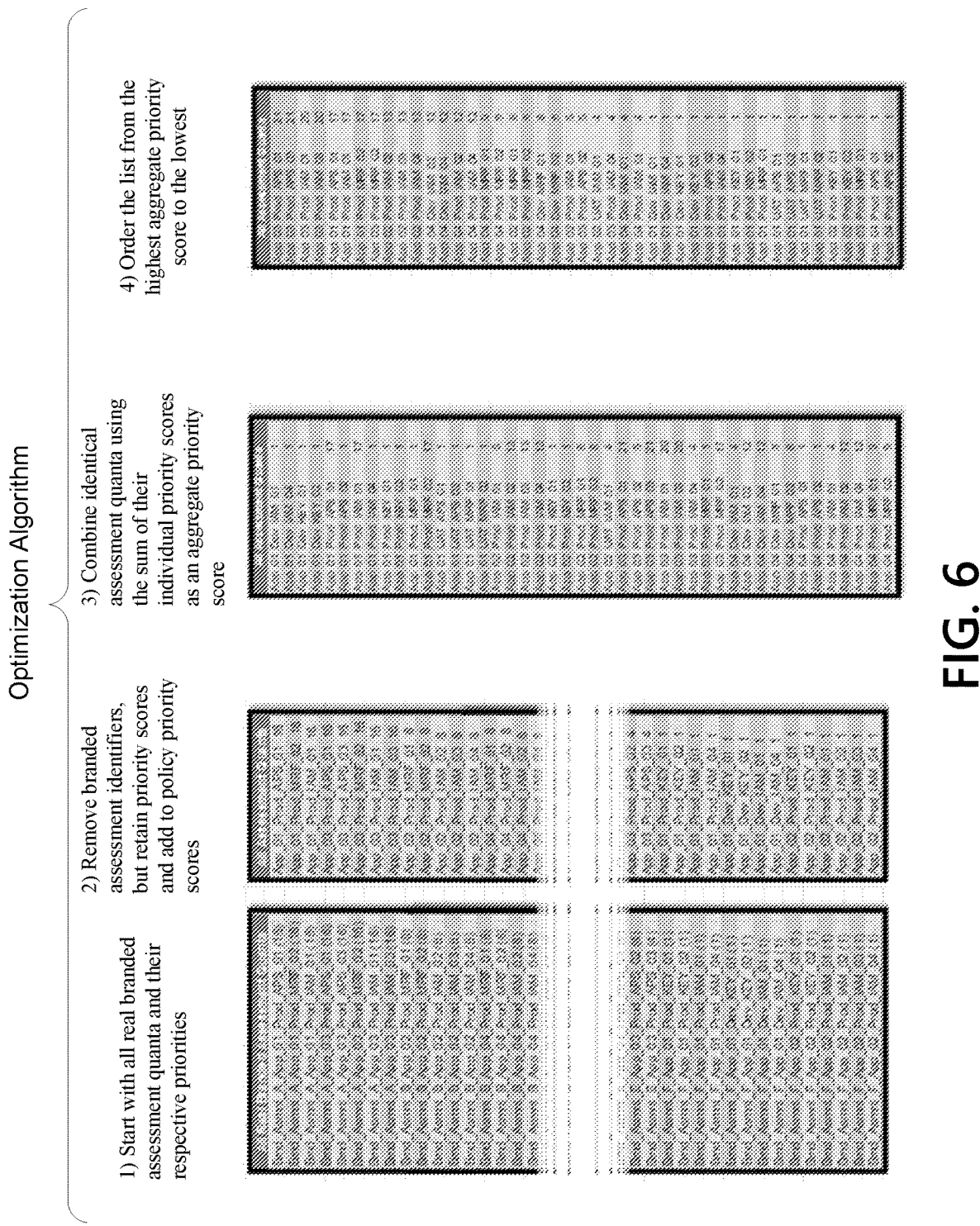
Figure 7:
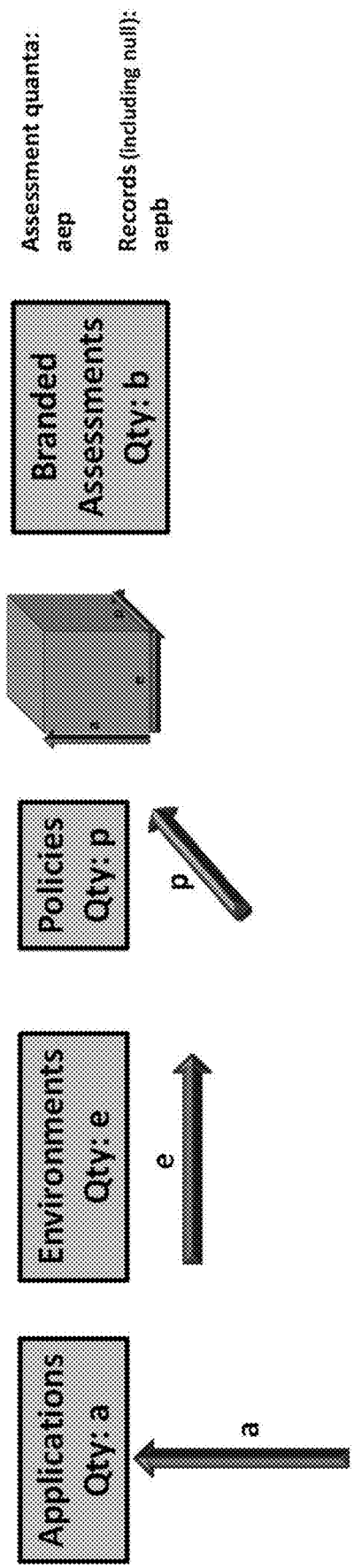

FIGS. 3-6 illustrates a series of computing operations that may be performed in controlling enterprise software policy compliance assessment processes based on quantum combinations of assessment elements. As discussed in greater detail below, one or more of these computing operations may be performed by quantum assessment computing platform 110 in combination with one or more other computer systems included in computing environment 100. For example, referring to FIG. 3, a first inclusion process may be executed (e.g., by quantum assessment computing platform 110). Next, referring to FIG. 4, a first exclusion process may be executed (e.g., by quantum assessment computing platform 110) and subsequently a second inclusion process may be executed (e.g., by quantum assessment computing platform 110). Next, referring to FIG. 5, a second exclusion process may be executed (e.g., by quantum assessment computing platform 110). Next, referring to FIG. 6, an optimization and aggregation process may be executed (e.g., by quantum assessment computing platform 110). Each of these processes are discussed in greater detail below. FIG. 7 illustrates a volume of assessment quanta that may be associated with this analysis. For example, in performing one or more of the computing operations illustrated in FIGS. 3-6, quantum assessment computing platform 110 may create, manipulate, and/or otherwise process the volume of assessment quanta and/or other records illustrated in FIG. 7.

In performing one or more of these computing operations, quantum assessment computing platform 110 may utilize a specific structure. For example, a quantum entity (R) that exists in an isolated quantum-space may be defined, with the following quantum states:

a. Policy Fraction ($\varphi$), a mixed quantum state carrying additional prioritizing information (f)
b. Application ID ($\alpha$), a mixed quantum state carrying additional risk profile information for prioritization ($\lambda$)
c. Environment ($\varepsilon$)
d. A discrete state for each branded assessment represented in the quantum-space ($a_0, a_1, \ldots, a_n$) such that $a_n$ is the assessment with the highest priority
e. A mixed quantum state (p) where $$p = \sum_{0}^{n} a_n \lambda_n$$

In addition, in performing one or more computing operations, quantum assessment computing platform 110 may utilize one or more specific domains. For example, for each $\varphi$, the set of all possible values may be binary: {0,Unique Fractionated Policy IDs}. For each f, there may be an arbitrary integer representing a priority relative to other policy fractions. For each $\alpha$, the set of all possible values may be: {All AIT numbers listed in AppHQ}. For each $\lambda$, there may be an arbitrary integer representing a risk profile relative to the profiles of other applications. For each $\varepsilon$, the set of all possible values may be: {D,U,S,A,Q,C,N,P}. For each a, the set of all possible values is binary such that for any $a_n$ the set of possible values is: $\{0,n\}$.

In addition, in performing one or more computing operations, quantum assessment computing platform 110 may utilize one or more specific quanta. For example, the quantum space (S) may be created and expanded by the inclusion of constituent quanta, such that:

$$S = \sum_0^m R(\alpha, \lambda, \varphi, f, \varepsilon, p, a0, a1, \ldots, an)$$

In addition, regarding time development, S may develop in time according to:

$$\frac{\partial}{\partial t} \sum_0^i R(\alpha, \lambda, \varphi, f, p, a0, a1, \ldots, an, t_q) = S(t)$$

where $t_q$ is the time that the observation was made.

In performing one or more computing operations, quantum assessment computing platform 110 may break each combination of policy fraction, application, assessment-inclusion into discrete quanta and enforce exclusion of redundant quantum states to ensure that there are no duplicate assessment questions put to any one application. The binary values possible for the assessment-inclusion quantum states may allow for having an application in-scope (n) or out-of-scope (0) for any arbitrary assessment type. The values of the policy-fraction state may allow a policy to be either in-scope (POL.J.K) or out-of-scope (0). Combining the assessment-inclusion quantum states into a mixed-state may allow for prioritization of assessment activity, as the assessments given the highest priority will have large possible values. Scheduling may then consist of ranking every R by the value of the mixed-state p, and grouping by α.

Figure 8A:
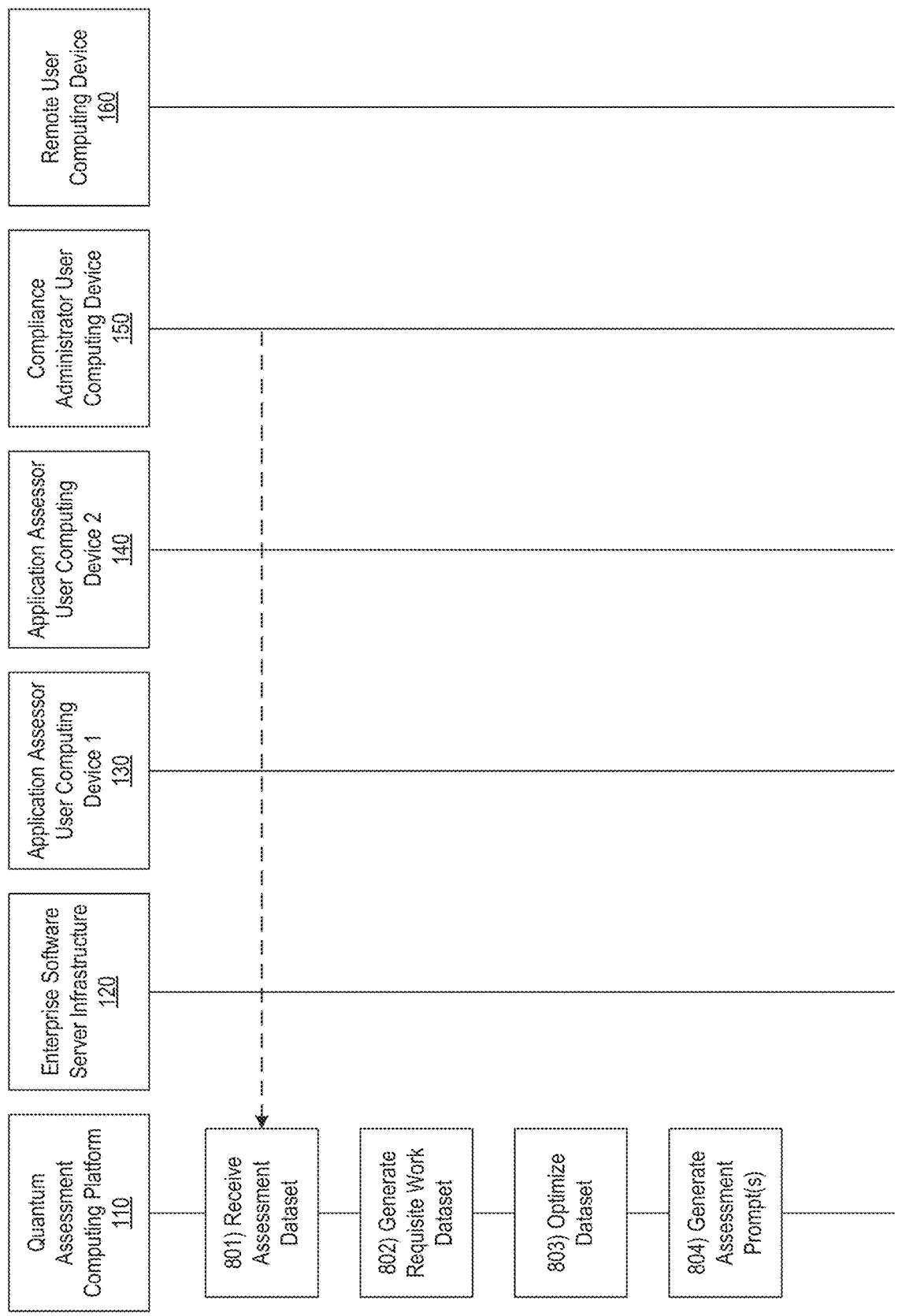
FIGS. 8A and 8B depict an illustrative event sequence for controlling enterprise software policy compliance assessment processes based on quantum combinations of assessment elements in accordance with one or more example embodiments.
Figure 8B:
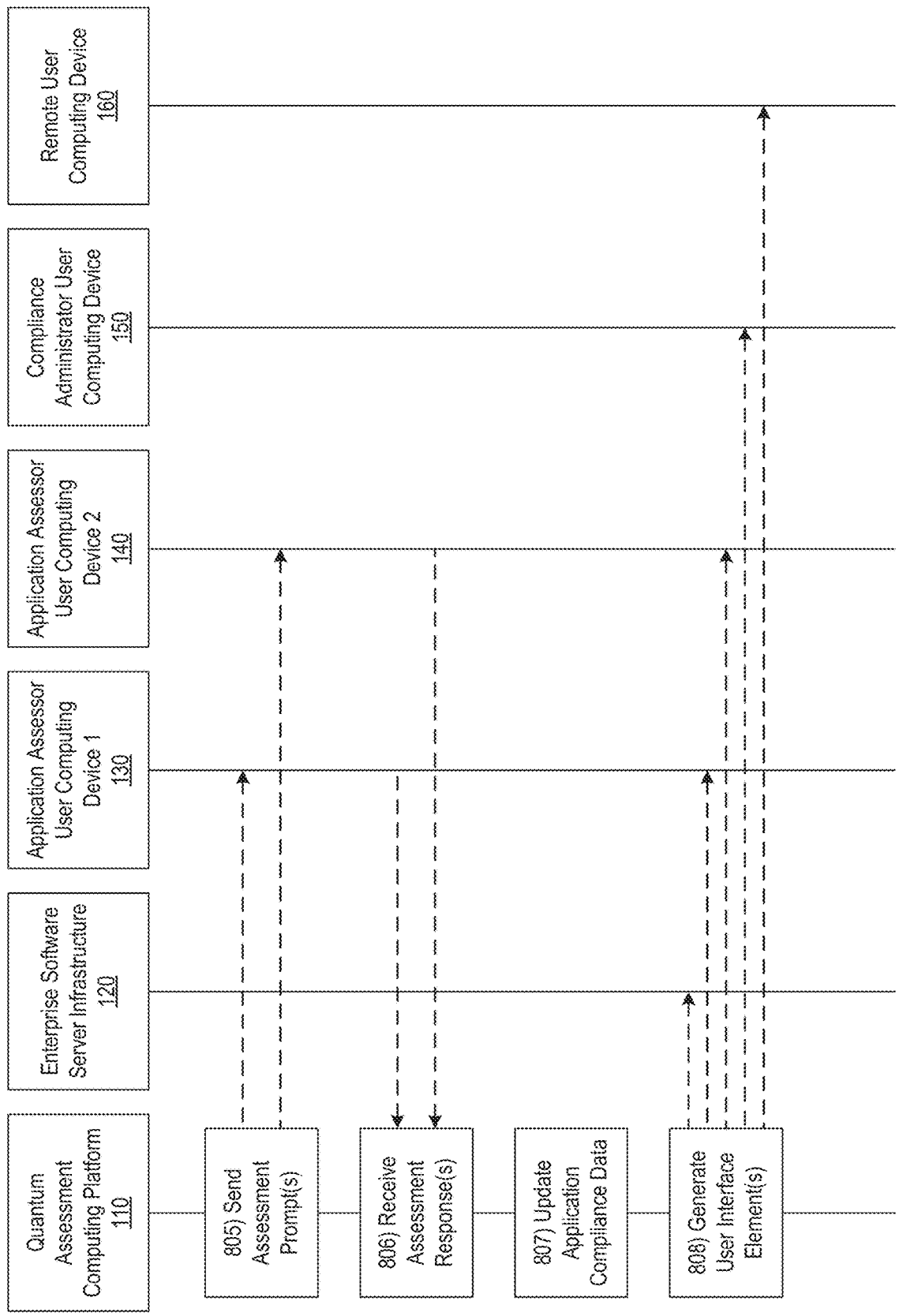

FIGS. 8A and 8B depict an illustrative event sequence for controlling enterprise software policy compliance assessment processes based on quantum combinations of assessment elements in accordance with one or more example embodiments. Referring to FIG. 8A, at step 801, quantum assessment computing platform 110 may receive an assessment dataset. For example, at step 801, quantum assessment computing platform 110 may receive, via the communication interface (e.g., communication interface 113), from a compliance administrator user computing device (e.g., compliance administrator user computing device 150), an assessment dataset.

In some embodiments, receiving the assessment dataset from the compliance administrator user computing device may include receiving information identifying a plurality of applications, information identifying a plurality of environments, information identifying a plurality of policies, information identifying priority data associated with the plurality of policies, information identifying a plurality of branded assessments, and information identifying priority values associated with the plurality of branded assessments. For example, in receiving the assessment dataset from the compliance administrator user computing device (e.g., compliance administrator user computing device 150) at step 801, quantum assessment computing platform 110 may receive information identifying a plurality of applications, information identifying a plurality of environments, information identifying a plurality of policies, information identifying priority data associated with the plurality of policies, information identifying a plurality of branded assessments, and information identifying priority values associated with the plurality of branded assessments. As illustrated below, quantum assessment computing platform 110 may use any and/or all of this information in initializing the quantum space described above.

At step 802, quantum assessment computing platform 110 may generate a requisite work dataset. For example, at step 802, quantum assessment computing platform 110 may generate a time-independent requisite work dataset based on the assessment dataset received from the compliance administrator user computing device (e.g., compliance administrator user computing device 150). In addition, the time-independent requisite work dataset (which may, e.g., be generated by quantum assessment computing platform 110 at step 802) may include assessment information identifying a plurality of real branded assessment quanta and priority information identifying a plurality of priority scores. Each priority score of the plurality of priority scores may, for instance, correspond to an assessment quantum of the plurality of real branded assessment quanta. For example, the requisite work dataset generated by quantum assessment computing platform 110 may be considered time-independent because the relevancy of assessments associated with the requisite work dataset may be evaluated without regard to when such assessments may be applicable and/or without regard to an amount time it might take to evaluate and/or verify compliance with a given assessment. In some instances, a 'branded assessment' may, for example, be and/or include a set of policies that are applicable to multiple applications in multiple environments. For example, one branded assessment may evaluate and/or confirm compliance with one set of regulations associated with handling of confidential client information, another branded assessment may evaluate and/or confirm compliance with another set of regulations associated with handling personally identifying information associated with financial transactions, and so on. In addition, each branded assessment quanta may, for instance, correspond to a single, standalone question as to whether a specific application in a specific environment complies with a specific policy. Each branded assessment quanta also may have a priority score reflective of how significant such compliance may be considered relative to compliance associated with other branded assessment quanta.

In some embodiments, generating the time-independent requisite work dataset based on the assessment dataset received from the compliance administrator user computing device may include executing a first inclusion process in which a plurality of application-environment-policy quanta are produced by applying each policy of a plurality of policies identified in the assessment dataset to each application-environment combination of a plurality of application-environment combinations identified in the assessment dataset. In addition, executing the first inclusion process may produce a first inclusive dataset. For example, in generating the time-independent requisite work dataset based on the assessment dataset received from the compliance administrator user computing device (e.g., compliance administrator user computing device 150) at step 802, quantum assessment computing platform 110 may execute a first inclusion process in which a plurality of application-environment-policy quanta are produced by applying each policy of a plurality of policies identified in the assessment dataset to each application-environment combination of a plurality of application-environment combinations identified in the assessment dataset. For instance, quantum assessment computing platform 110 may execute an inclusion process similar to the inclusion process illustrated in FIG. 3. In addition, executing the first inclusion process may produce a first inclusive dataset, which may be further processed by quantum assessment computing platform 110 as discussed below.

In some embodiments, generating the time-independent requisite work dataset based on the assessment dataset received from the compliance administrator user computing device may include, after executing the first inclusion process, executing a first exclusion process in which one or more application-environment-policy quanta are removed from the first inclusive dataset based on policy exception data. In addition, executing the first exclusion process may produce a first filtered dataset. For example, in generating the time-independent requisite work dataset based on the assessment dataset received from the compliance administrator user computing device (e.g., compliance administrator user computing device 150) at step 802, quantum assessment computing platform 110 may, after executing the first inclusion process, execute a first exclusion process in which one or more application-environment-policy quanta are removed from the first inclusive dataset based on policy exception data. For instance, quantum assessment computing platform 110 may execute an exclusion process similar to the exclusion process illustrated in FIG. 4. In addition, executing the first exclusion process may produce a first filtered dataset, which may be further processed by quantum assessment computing platform 110 as discussed below.

In some embodiments, executing the first exclusion process may include receiving the policy exception data from the compliance administrator user computing device. For example, in executing the first exclusion process, quantum assessment computing platform 110 may receive the policy exception data from the compliance administrator user computing device (e.g., compliance administrator user computing device 150).

In some embodiments, the policy exception data may identify a first set of policies not levied against one or more specific applications and a second set of policies not levied against one or more specific environments. For example, the policy exception data (which may, e.g., be received by quantum assessment computing platform 110 from compliance administrator user computing device 150) may identify a first set of policies not levied against one or more specific applications and a second set of policies not levied against one or more specific environments. Quantum assessment computing platform 110 may, for instance, use such policy exception data in filtering a set of all possible assessment quanta down to a set of all potential assessment quanta.

In some embodiments, generating the time-independent requisite work dataset based on the assessment dataset received from the compliance administrator user computing device may include, after executing the first exclusion process, executing a second inclusion process in which a plurality of branded-assessment quanta are produced by applying a plurality of branded assessments and corresponding priority scores to each application-environment-policy quanta included in the first filtered dataset. In addition, executing the second inclusion process may produce a second inclusive dataset. For example, in generating the time-independent requisite work dataset based on the assessment dataset received from the compliance administrator user computing device (e.g., compliance administrator user computing device 150) at step 802, quantum assessment computing platform 110 may, after executing the first exclusion process, execute a second inclusion process in which a plurality of branded-assessment quanta are produced by applying a plurality of branded assessments and corresponding priority scores to each application-environment-policy quanta included in the first filtered dataset. For instance, quantum assessment computing platform 110 may execute an inclusion process similar to the inclusion process illustrated in FIG. 4. In addition, executing the second inclusion process may produce a second inclusive dataset, which may be further processed by quantum assessment computing platform 110 as discussed below.

In some embodiments, generating the time-independent requisite work dataset based on the assessment dataset received from the compliance administrator user computing device may include, after executing the second inclusion process, executing a second exclusion process in which one or more branded-assessment quanta are removed from the second inclusive dataset based on application-policy-environment scope data. In addition, executing the second exclusion process may produce the time-independent requisite work dataset that includes the assessment information identifying the plurality of real branded assessment quanta and the priority information identifying the plurality of priority scores. For example, in generating the time-independent requisite work dataset based on the assessment dataset received from the compliance administrator user computing device (e.g., compliance administrator user computing device 150) at step 802, quantum assessment computing platform 110 may, after executing the second inclusion process, execute a second exclusion process in which one or more branded-assessment quanta are removed from the second inclusive dataset based on application-policy-environment scope data. For instance, quantum assessment computing platform 110 may execute an exclusion process similar to the exclusion process illustrated in FIG. 5. In addition, executing the second exclusion process may produce the time-independent requisite work dataset that includes the assessment information identifying the plurality of real branded assessment quanta and the priority information identifying the plurality of priority scores, which may be further processed by quantum assessment computing platform 110 (e.g., at step 803) as discussed below.

In some embodiments, executing the second exclusion process may include receiving the application-policy-environment scope data from the compliance administrator user computing device. For example, in executing the second exclusion process, quantum assessment computing platform 110 may receive the application-policy-environment scope data from the compliance administrator user computing device (e.g., compliance administrator user computing device 150).

In some embodiments, the application-policy-environment scope data may identify a set of applications that are out of scope for one or more specific branded assessments, a set of policies that are out of scope for one or more specific branded assessments, and a set of environments that are out of scope for one or more specific branded assessments. For example, the application-policy-environment scope data (which may, e.g., be received by quantum assessment computing platform 110 from compliance administrator user computing device 150) may identify a set of applications that are out of scope for one or more specific branded assessments, a set of policies that are out of scope for one or more specific branded assessments, and a set of environments that are out of scope for one or more specific branded assessments. Quantum assessment computing platform 110 may, for instance, use such application-policy-environment scope data a set of all potential branded assessment quanta and their respective priorities down to a set of all real branded assessment quanta and their respective priorities.

At step 803, quantum assessment computing platform 110 may optimize the requisite work dataset to produce a prioritized schedule. For example, at step 803, quantum assessment computing platform 110 may optimize the time-independent requisite work dataset by aggregating related assessment quanta associated with the plurality of real branded assessment quanta. In addition, optimizing the time-independent requisite work dataset may produce a prioritized schedule of application assessment quanta. For instance, in optimizing the time-independent requisite work dataset, quantum assessment computing platform 110 may produce a prioritized schedule of application assessment quanta.

In some embodiments, optimizing the time-independent requisite work dataset by aggregating the related assessment quanta associated with the plurality of real branded assessment quanta may include: removing branded-assessment identifiers from the plurality of real branded assessment quanta, where removing the branded-assessment identifiers from the plurality of real branded assessment quanta produces a generalized dataset of generalized assessment quanta; and combining identical generalized assessment quanta included in the generalized dataset of generalized assessment quanta to produce an aggregated dataset of aggregated assessment quanta, where combining the identical generalized assessment quanta comprises aggregating priority scores associated with the identical generalized assessment quanta. For example, in optimizing the time-independent requisite work dataset by aggregating the related assessment quanta associated with the plurality of real branded assessment quanta at step 803, quantum assessment computing platform 110 may remove branded-assessment identifiers from the plurality of real branded assessment quanta, like in the optimization algorithm illustrated in FIG. 6. In removing the branded-assessment identifiers from the plurality of real branded assessment quanta, quantum assessment computing platform 110 may produce a generalized dataset of generalized assessment quanta, which may be further processed by quantum assessment computing platform 110 as discussed below. Subsequently, quantum assessment computing platform 110 may combine identical generalized assessment quanta included in the generalized dataset of generalized assessment quanta to produce an aggregated dataset of aggregated assessment quanta, like in the optimization algorithm illustrated in FIG. 6. In combining the identical generalized assessment quanta, quantum assessment computing platform 110 may aggregate priority scores associated with the identical generalized assessment quanta. For example, quantum assessment computing platform 110 may combine identical assessment quanta using the sum of their individual priority scores as an aggregate priority score for the combination, like in the optimization algorithm illustrated in FIG. 6.

In some embodiments, optimizing the time-independent requisite work dataset by aggregating the related assessment quanta associated with the plurality of real branded assessment quanta may include ordering the aggregated dataset of aggregated assessment quanta based on an aggregate priority score associated with each aggregated assessment quantum included in the aggregated dataset of aggregated assessment quanta, where ordering the aggregated dataset of aggregated assessment quanta produces the prioritized schedule of application assessment quanta. For example, in optimizing the time-independent requisite work dataset by aggregating the related assessment quanta associated with the plurality of real branded assessment quanta at step 803, quantum assessment computing platform 110 may order the aggregated dataset of aggregated assessment quanta based on an aggregate priority score associated with each aggregated assessment quantum included in the aggregated dataset of aggregated assessment quanta, like in the optimization algorithm illustrated in FIG. 6. In addition, in ordering the aggregated dataset of aggregated assessment quanta, quantum assessment computing platform 110 may produce the prioritized schedule of application assessment quanta. This final list, as shown in FIG. 6, is the order in which assessments should be executed, regardless of available resources. It is prioritized by an aggregate score that will order the work by the most represented assessment quanta among the most-highly prioritized branded assessments. As the aggregate score are derived from branded assessment priority values, threshold can be placed along the list which can be used for calculating resourcing. Branded assessments can be reconstructed as reports from the common records of assessments once the optimized list has been worked to the point where the aggregate priority score is less than the priority score of the branded assessment.

At step 804, quantum assessment computing platform 110 may generate one or more assessment prompts. For example, at step 804, quantum assessment computing platform 110 may generate a plurality of non-overlapping assessment prompts based on the prioritized schedule of application assessment quanta (which may, e.g., have been generated and optimized by quantum assessment computing platform 110 at step 803). Each assessment prompt may, for instance, include commands and/or data that prompts a recipient system and/or user to confirm that a specific application operating in a specific environment complies with a specific policy. The plurality of assessments prompts may be 'non-overlapping' in that every prompt that is generated by quantum assessment computing platform 110 may be distinct and/or different from all other generated prompts. In other words, even though two or more branded assessments might require the same assessment of whether a particular application operating in a particular environment complies with a particular policy, quantum assessment computing platform 110 might generate only one prompt for this assessment and subsequently use a single response to the prompt in evaluating overall compliance with the two or more branded assessments. This approach thus may eliminate redundancy when assessing the compliance of all applications in all environments with all policies with respect to all branded assessments, thereby reducing resource utilization, reducing bandwidth utilization, and optimizing for the efficient operations of the computing infrastructure that hosts and/or otherwise supports the various software applications and computing environments, such as enterprise software server infrastructure 120, application assessor user computing device 130, application assessor user computing device 140, compliance administrator user computing device 150, and/or remote user computing device 160.

Figure 9:
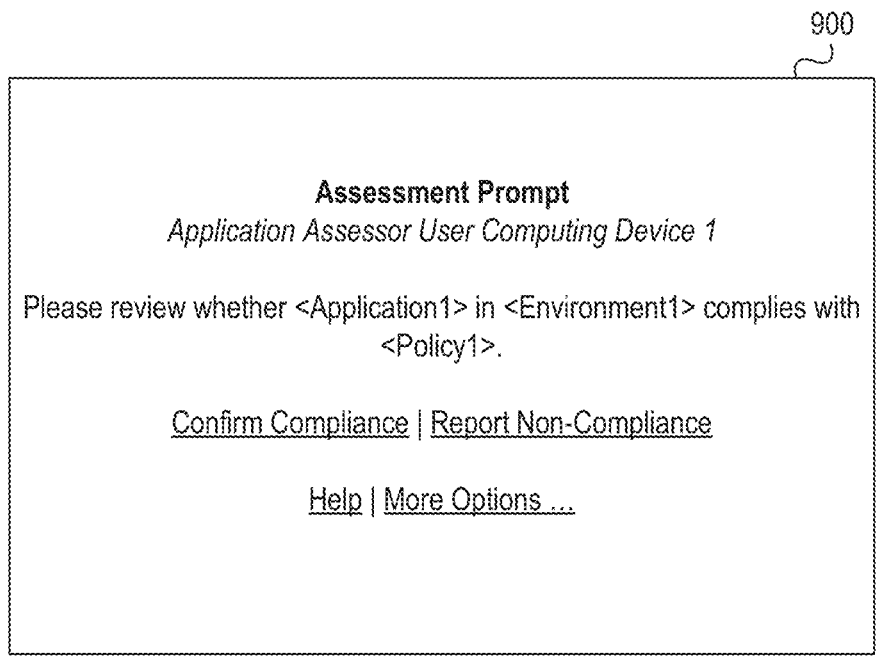
FIGS. 9-12 depict example graphical user interfaces for controlling enterprise software policy compliance assessment processes based on quantum combinations of assessment elements in accordance with one or more example embodiments.
Figure 10:
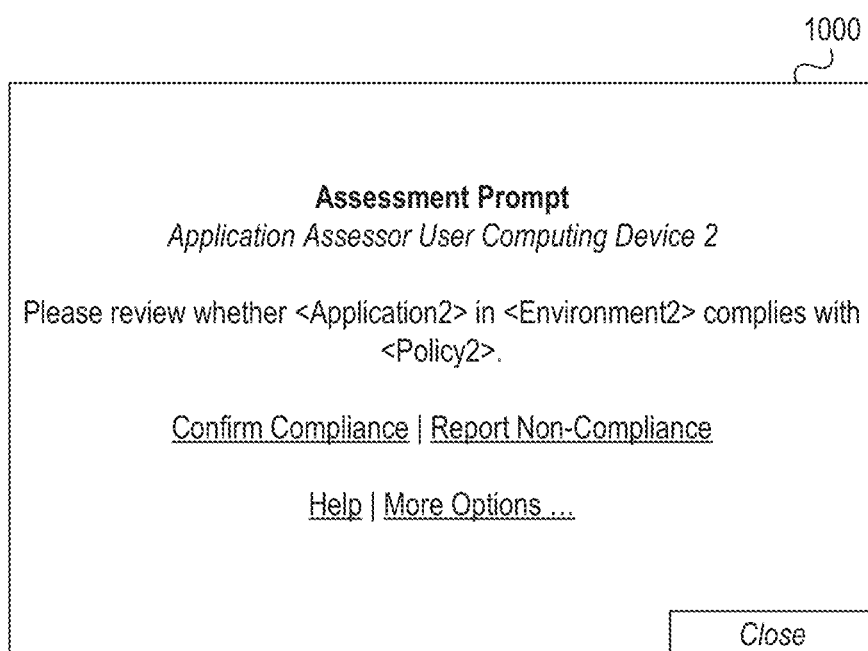

Referring to FIG. 8B, at step 805, quantum assessment computing platform 110 may send the one or more assessment prompts. For example, at step 805, quantum assessment computing platform 110 may send, via the communication interface (e.g., communication interface 113), to a plurality of application assessor user computing devices (e.g., application assessor user computing device 130, application assessor user computing device 140), the plurality of non-overlapping assessment prompts generated based on the prioritized schedule of application assessment quanta. In sending the plurality of non-overlapping assessment prompts generated based on the prioritized schedule of application assessment quanta to the plurality of application assessor user computing devices (e.g., application assessor user computing device 130, application assessor user computing device 140), quantum assessment computing platform 110 may cause the plurality of application assessor user computing devices (e.g., application assessor user computing device 130, application assessor user computing device 140) to display and/or otherwise present one or more graphical user interfaces. For example, quantum assessment computing platform 110 may cause application assessor user computing device 130 to display and/or otherwise present a graphical user interface similar to graphical user interface 900, which is illustrated in FIG. 9. As seen in FIG. 9, graphical user interface 900 may include text and/or other information associated with a first assessment prompt generated by quantum assessment computing platform 110 (e.g., "Please review whether <Application1> in <Environment1> complies with <Policy1>. Confirm Compliance|Report Non-Compliance"). Additionally or alternatively, quantum assessment computing platform 110 may cause application assessor user computing device 140 to display and/or otherwise present a graphical user interface similar to graphical user interface 1000, which is illustrated in FIG. 10. As seen in FIG. 10, graphical user interface 1000 may include text and/or other information associated with a second assessment prompt generated by quantum assessment computing platform 110 (e.g., "Please review whether <Application2> in <Environment2> complies with <Policy2>. Confirm Compliance|Report Non-Compliance").

In some embodiments, sending the plurality of non-overlapping assessment prompts generated based on the prioritized schedule of application assessment quanta to the plurality of application assessor user computing devices may include: sending, via the communication interface, to a first assessor user computing device, a first assessment prompt associated with a first application assessment quantum selected from the prioritized schedule of application assessment quanta; and sending, via the communication interface, to a second assessor user computing device different from the first assessor user computing device, a second assessment prompt associated with a second application assessment quantum selected from the prioritized schedule of application assessment quanta, the second application assessment quantum being different from the first application assessment quantum. For example, in sending the plurality of non-overlapping assessment prompts generated based on the prioritized schedule of application assessment quanta to the plurality of application assessor user computing devices (e.g., application assessor user computing device 130, application assessor user computing device 140) at step 805, quantum assessment computing platform 110 may send, via the communication interface (e.g., communication interface 113), to a first assessor user computing device (e.g., application assessor user computing device 130), a first assessment prompt associated with a first application assessment quantum selected from the prioritized schedule of application assessment quanta. In addition, quantum assessment computing platform 110 may send, via the communication interface (e.g., communication interface 113), to a second assessor user computing device (e.g., application assessor user computing device 140) different from the first assessor user computing device (e.g., application assessor user computing device 130), a second assessment prompt associated with a second application assessment quantum selected from the prioritized schedule of application assessment quanta, and the second application assessment quantum may be different from the first application assessment quantum.

At step 806, quantum assessment computing platform 110 may receive one or more assessment responses. For example, at step 806, quantum assessment computing platform 110 may receive assessment responses from application assessor user computing device 130 and/or application assessor user computing device 140 in response to the assessment prompts sent by quantum assessment computing platform 110 at step 805. At step 807, quantum assessment computing platform 110 may update application compliance data. For example, at step 807, quantum assessment computing platform 110 may update application compliance data associated with one or more branded assessments based on the one or more assessment responses received at step 806 (e.g., from application assessor user computing device 130 and application assessor user computing device 140).

Figure 11:
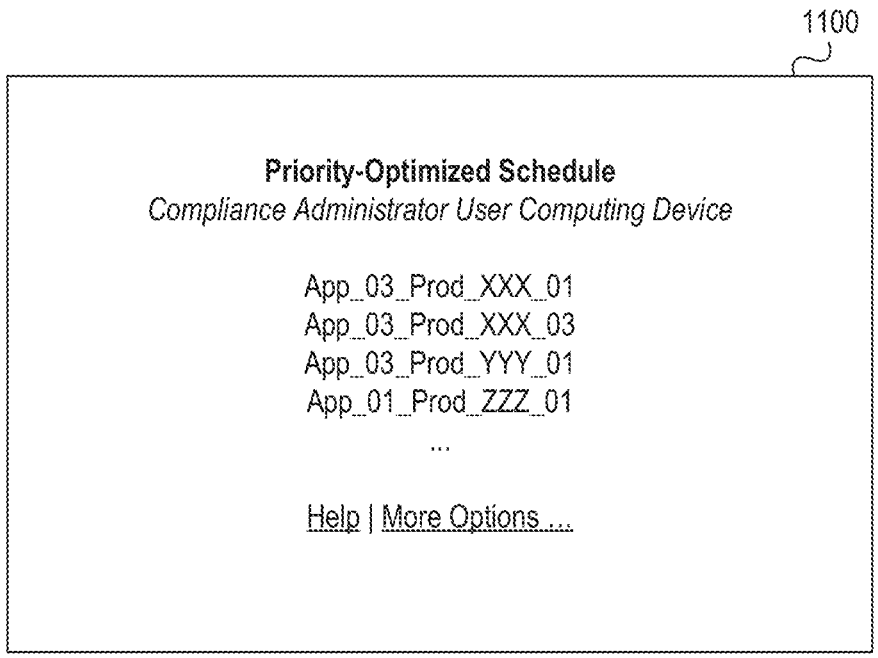
Figure 12:
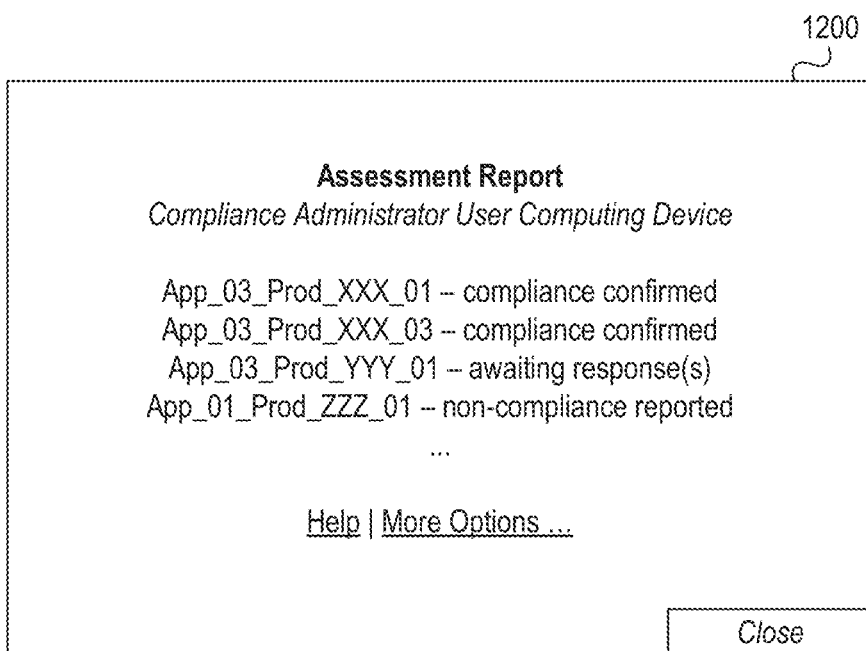

At step 808, quantum assessment computing platform 110 may generate one or more user interface elements (e.g., based on the prioritized schedule, the one or more assessment responses, and/or the application compliance data). For example, at step 808, quantum assessment computing platform 110 may generate one or more user interface elements based on the prioritized schedule of application assessment quanta. In addition, the one or more user interface elements generated based on the prioritized schedule of application assessment quanta may be provided to the compliance administrator user computing device (e.g., compliance administrator user computing device 150) and/or one or more other devices (e.g., enterprise software server infrastructure 120, application assessor user computing device 130, application assessor user computing device 140, remote user computing device 160). The one or more user interface elements generated by quantum assessment computing platform 110 may, in some instances, be displayed and/or otherwise presented by such devices in the form of a report, web page, and/or the like. For example, in generating the one or more user interface elements based on the prioritized schedule of application assessment quanta at step 808, quantum assessment computing platform 110 may cause compliance administrator user computing device 150 to display and/or otherwise present a graphical user interface similar to graphical user interface 1100, which is illustrated in FIG. 11. As seen in FIG. 11, graphical user interface 1100 may include text and/or other information identifying contents of the prioritized schedule of application assessment quanta. Additionally or alternatively, in generating the one or more user interface elements based on the prioritized schedule of application assessment quanta at step 808, quantum assessment computing platform 110 may cause compliance administrator user computing device 150 to display and/or otherwise present a graphical user interface similar to graphical user interface 1200, which is illustrated in FIG. 12. As seen in FIG. 12, graphical user interface 1200 may include text and/or other information identifying contents of the prioritized schedule of application assessment quanta as well as updated application compliance data associated with one or more branded assessments.

Figure 13:
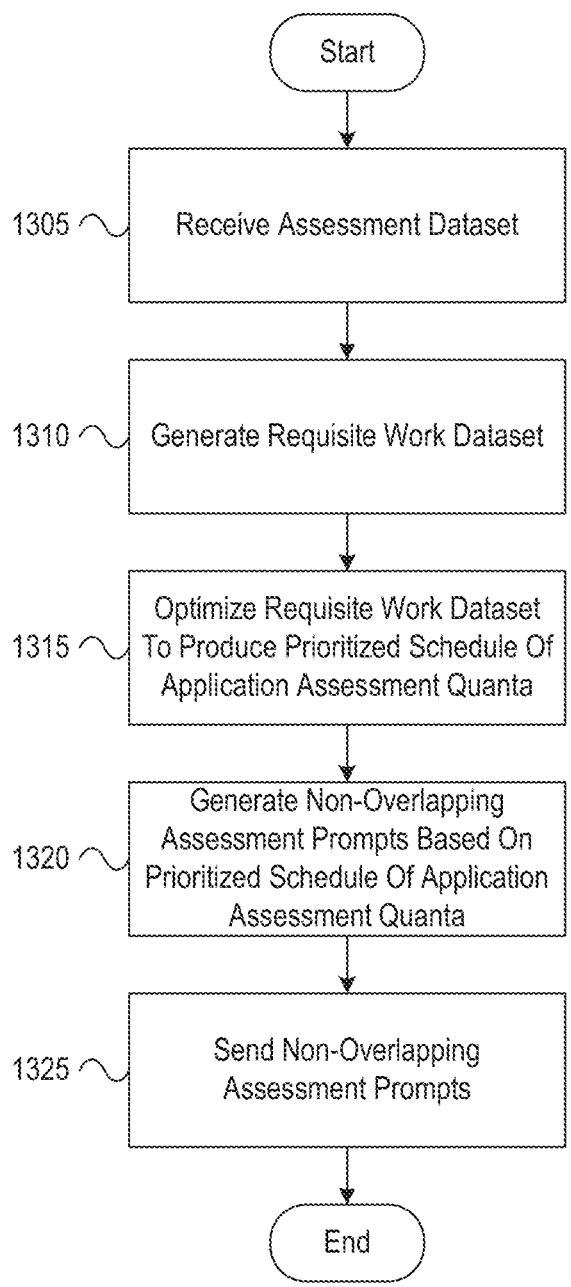
FIG. 13 depicts an illustrative method for controlling enterprise software policy compliance assessment processes based on quantum combinations of assessment elements in accordance with one or more example embodiments.

FIG. 13 depicts an illustrative method for controlling enterprise software policy compliance assessment processes based on quantum combinations of assessment elements in accordance with one or more example embodiments. Referring to FIG. 13, at step 1305, a computing platform having at least one processor, a communication interface, and memory may receive, via the communication interface, from a compliance administrator user computing device, an assessment dataset. At step 1310, the computing platform may generate a time-independent requisite work dataset based on the assessment dataset received from the compliance administrator user computing device. The time-independent requisite work dataset may include assessment information identifying a plurality of real branded assessment quanta and priority information identifying a plurality of priority scores. In addition, each priority score of the plurality of priority scores may correspond to an assessment quantum of the plurality of real branded assessment quanta. At step 1315, the computing platform may optimize the time-independent requisite work dataset by aggregating related assessment quanta associated with the plurality of real branded assessment quanta. In addition, by optimizing the time-independent requisite work dataset, the computing platform may produce a prioritized schedule of application assessment quanta. At step 1320, the computing platform may generate a plurality of non-overlapping assessment prompts based on the prioritized schedule of application assessment quanta. At step 1325, the computing platform may send, via the communication interface, to a plurality of application assessor user computing devices, the plurality of non-overlapping assessment prompts generated based on the prioritized schedule of application assessment quanta.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   generate a time-independent requisite work dataset based on an assessment dataset received from a compliance administrator user computing device, wherein the time-independent requisite work dataset comprises assessment information identifying a plurality of real branded assessment quanta and priority information identifying a plurality of priority scores, wherein each priority score of the plurality of priority scores corresponds to an assessment quantum of the plurality of real branded assessment quanta and wherein generating the time-independent requisite work dataset based on the assessment dataset received from the compliance administrator user computing device comprises:
   executing a first inclusion process in which a plurality of application-environment-policy quanta are produced by applying each policy of a plurality of policies identified in the assessment dataset to each application-environment combination of a plurality of application-environment combinations identified in the assessment dataset, wherein executing the first inclusion process produces a first inclusive dataset;
   after executing the first inclusion process, executing a first exclusion process in which one or more application-environment-policy quanta are removed from the first inclusive dataset based on policy exception data, wherein executing the first exclusion process produces a first filtered dataset; and after executing the first exclusion process, executing a second inclusion process in which a plurality of branded-assessment quanta are produced by applying a plurality of branded assessments and corresponding priority scores to each application-environment-policy quanta included in the first filtered dataset, wherein executing the second inclusion process produces a second inclusive dataset;

optimize the time-independent requisite work dataset based on the plurality of real branded assessment quanta, wherein optimizing the time-independent requisite work dataset produces a prioritized schedule of application assessment quanta;

generate a plurality of non-overlapping assessment prompts based on the prioritized schedule of application assessment quanta, each non-overlapping assessment prompt including commands that prompt a recipient device to confirm that an application operating in an environment complies with a policy; and send, via the communication interface, to a plurality of application assessor user computing devices, the plurality of non-overlapping assessment prompts generated based on the prioritized schedule of application assessment quanta, wherein sending the plurality of non-overlapping assessment prompts generated based on the prioritized schedule of application assessment quanta causes the plurality of application assessor user computing devices to display one or more user interfaces.

2. The computing platform of claim 1, wherein the assessment dataset received from the compliance administrator user computing device comprises information identifying a plurality of applications, information identifying a plurality of environments, information identifying a plurality of policies, information identifying priority data associated with the plurality of policies, information identifying a plurality of branded assessments, and information identifying priority values associated with the plurality of branded assessments.

3. The computing platform of claim 1, wherein executing the first exclusion process comprises receiving the policy exception data from the compliance administrator user computing device.

4. The computing platform of claim 1, wherein the policy exception data identifies a first set of policies not levied against one or more specific applications and a second set of policies not levied against one or more specific environments.

5. The computing platform of claim 1, wherein generating the time-independent requisite work dataset based on the assessment dataset received from the compliance administrator user computing device comprises:

after executing the second inclusion process, executing a second exclusion process in which one or more branded-assessment quanta are removed from the second inclusive dataset based on application-policy-environment scope data, wherein executing the second exclusion process produces the time-independent requisite work dataset comprising the assessment information identifying the plurality of real branded assessment quanta and the priority information identifying the plurality of priority scores.

6. The computing platform of claim 5, wherein executing the second exclusion process comprises receiving the application-policy-environment scope data from the compliance administrator user computing device.

7. The computing platform of claim 5, wherein the application-policy-environment scope data identifies a set of applications that are out of scope for one or more specific branded assessments, a set of policies that are out of scope for one or more specific branded assessments, and a set of environments that are out of scope for one or more specific branded assessments.

8. The computing platform of claim 5, wherein optimizing the time-independent requisite work dataset based on the plurality of real branded assessment quanta comprises:

removing branded-assessment identifiers from the plurality of real branded assessment quanta, wherein removing the branded-assessment identifiers from the plurality of real branded assessment quanta produces a generalized dataset of generalized assessment quanta; and combining identical generalized assessment quanta included in the generalized dataset of generalized assessment quanta to produce a dataset of aggregated assessment quanta, wherein combining the identical generalized assessment quanta comprises aggregating priority scores associated with the identical generalized assessment quanta.

9. The computing platform of claim 8, wherein optimizing the time-independent requisite work dataset based on the plurality of real branded assessment quanta comprises:

ordering the dataset of aggregated assessment quanta based on an aggregate priority score associated with each aggregated assessment quantum included in the dataset of aggregated assessment quanta, wherein ordering the dataset of aggregated assessment quanta produces the prioritized schedule of application assessment quanta.

10. The computing platform of claim 1, wherein sending the plurality of non-overlapping assessment prompts generated based on the prioritized schedule of application assessment quanta to the plurality of application assessor user computing devices comprises:

sending, via the communication interface, to a first assessor user computing device, a first assessment prompt associated with a first application assessment quantum selected from the prioritized schedule of application assessment quanta; and sending, via the communication interface, to a second assessor user computing device different from the first assessor user computing device, a second assessment prompt associated with a second application assessment quantum selected from the prioritized schedule of application assessment quanta, the second application assessment quantum being different from the first application assessment quantum.

11. The computing platform of claim 1, wherein the memory stores additional computer-readable instructions that, when executed by the at least one processor, cause the computing platform to:

generate one or more user interface elements based on the prioritized schedule of application assessment quanta, wherein the one or more user interface elements generated based on the prioritized schedule of application assessment quanta are provided to the compliance administrator user computing device.

12. A method, comprising:

at a computing platform comprising at least one processor, a communication interface, and memory:

generating, by the at least one processor, a time-independent requisite work dataset based on an assessment dataset received from a compliance administrator user computing device, wherein the time-independent requisite work dataset comprises assessment information identifying a plurality of real branded assessment quanta and priority information identifying a plurality of priority scores, wherein each priority score of the plurality of priority scores corresponds to an assessment quantum of the plurality of real branded assessment quanta and wherein generating the time-independent requisite work dataset based on the assessment dataset received from the compliance administrator user computing device comprises:

executing a first inclusion process in which a plurality of application-environment-policy quanta are produced by applying each policy of a plurality of policies identified in the assessment dataset to each application-environment combination of a plurality of application-environment combinations identified in the assessment dataset, wherein executing the first inclusion process produces a first inclusive dataset;

after executing the first inclusion process, executing a first exclusion process in which one or more application-environment-policy quanta are removed from the first inclusive dataset based on policy exception data, wherein executing the first exclusion process produces a first filtered dataset; and after executing the first exclusion process, executing a second inclusion process in which a plurality of branded-assessment quanta are produced by applying a plurality of branded assessments and corresponding priority scores to each application-environment-policy quanta included in the first filtered dataset, wherein executing the second inclusion process produces a second inclusive dataset;

optimizing, by the at least one processor, the time-independent requisite work dataset based on the plurality of real branded assessment quanta, wherein optimizing the time-independent requisite work dataset produces a prioritized schedule of application assessment quanta;

generating, by the at least one processor, a plurality of non-overlapping assessment prompts based on the prioritized schedule of application assessment quanta, each non-overlapping assessment prompt including commands that prompt a recipient device to confirm that an application operating in an environment complies with a policy; and sending, by the at least one processor, via the communication interface, to a plurality of application assessor user computing devices, the plurality of non-overlapping assessment prompts generated based on the prioritized schedule of application assessment quanta, wherein sending the plurality of non-overlapping assessment prompts generated based on the prioritized schedule of application assessment quanta causes the plurality of application assessor user computing devices to display one or more user interfaces.

13. The method of claim 12, wherein the assessment dataset from the compliance administrator user computing device comprises information identifying a plurality of applications, information identifying a plurality of environments, information identifying a plurality of policies, information identifying priority data associated with the plurality of policies, information identifying a plurality of branded assessments, and information identifying priority values associated with the plurality of branded assessments.

14. The method of claim 12, wherein executing the first exclusion process comprises receiving the policy exception data from the compliance administrator user computing device.

15. The method of claim 12, wherein the policy exception data identifies a first set of policies not levied against one or more specific applications and a second set of policies not levied against one or more specific environments.

16. The method of claim 12, wherein generating the time-independent requisite work dataset based on the assessment dataset received from the compliance administrator user computing device comprises:

after executing the second inclusion process, executing a second exclusion process in which one or more branded-assessment quanta are removed from the second inclusive dataset based on application-policy-environment scope data, wherein executing the second exclusion process produces the time-independent requisite work dataset comprising the assessment information identifying the plurality of real branded assessment quanta and the priority information identifying the plurality of priority scores.

17. The method of claim 16, wherein executing the second exclusion process comprises receiving the application-policy-environment scope data from the compliance administrator user computing device.

18. The method of claim 16, wherein the application-policy-environment scope data identifies a set of applications that are out of scope for one or more specific branded assessments, a set of policies that are out of scope for one or more specific branded assessments, and a set of environments that are out of scope for one or more specific branded assessments.

19. One or more non-transitory computer-readable media storing instructions that, when executed by a computing platform comprising at least one processor, a communication interface, and memory, cause the computing platform to:

generate a time-independent requisite work dataset based on an assessment dataset received from a compliance administrator user computing device, wherein the time-independent requisite work dataset comprises assessment information identifying a plurality of real branded assessment quanta and priority information identifying a plurality of priority scores, wherein each priority score of the plurality of priority scores corresponds to an assessment quantum of the plurality of real branded assessment quanta and wherein generating the time-independent requisite work dataset based on the assessment dataset received from the compliance administrator user computing device comprises:

executing a first inclusion process in which a plurality of application-environment-policy quanta are produced by applying each policy of a plurality of policies identified in the assessment dataset to each application-environment combination of a plurality of application-environment combinations identified in the assessment dataset, wherein executing the first inclusion process produces a first inclusive dataset;

after executing the first inclusion process, executing a first exclusion process in which one or more application-environment-policy quanta are removed from the first inclusive dataset based on policy exception data, wherein executing the first exclusion process produces a first filtered dataset; and after executing the first exclusion process, executing a second inclusion process in which a plurality of branded-assessment quanta are produced by applying a plurality of branded assessments and corresponding priority scores to each application-environment-policy quanta included in the first filtered dataset, wherein executing the second inclusion process produces a second inclusive dataset;

optimize the time-independent requisite work dataset based on the plurality of real branded assessment quanta, wherein optimizing the time-independent requisite work dataset produces a prioritized schedule of application assessment quanta;

generate a plurality of non-overlapping assessment prompts based on the prioritized schedule of application assessment quanta, each non-overlapping assessment prompt including commands that prompt a recipient device to confirm that an application operating in an environment complies with a policy; and send, via the communication interface, to a plurality of application assessor user computing devices, the plurality of non-overlapping assessment prompts generated based on the prioritized schedule of application assessment quanta, wherein sending the plurality of non-overlapping assessment prompts generated based on the prioritized schedule of application assessment quanta causes the plurality of application assessor user computing devices to display one or more user interfaces.

20. The one or more non-transitory computer-readable media of claim 19, wherein executing the first exclusion process comprises receiving the policy exception data from the compliance administrator user computing device.

* * * * *